(12) United States Patent
Meier, III et al.

(10) Patent No.: US 8,602,425 B1
(45) Date of Patent: Dec. 10, 2013

(54) COMPACT PORTABLE SAFETY COMPLIANCE STATION AND METHOD OF MAKING SAME

(75) Inventors: Andrew Meier, III, Carlsbad, CA (US); Richard T. Whitaker, Encinitas, CA (US)

(73) Assignee: R and A Solutions, Encinitas, CA (US)

( * ) Notice: Subject to any disclaimer, the term of this patent is extended or adjusted under 35 U.S.C. 154(b) by 0 days.

(21) Appl. No.: 13/563,325

(22) Filed: Jul. 31, 2012

Related U.S. Application Data

(60) Provisional application No. 61/513,934, filed on Aug. 1, 2011.

(51) Int. Cl.
*B62B 1/14* (2006.01)
(52) U.S. Cl.
USPC ................................ 280/47.26; 280/47.27
(58) Field of Classification Search
USPC .................. 280/47.24, 47.26, 47.27, 47.28
See application file for complete search history.

(56) References Cited

U.S. PATENT DOCUMENTS

| | | | |
|---|---|---|---|
| 2,905,480 A | 9/1959 | Giovannelli | |
| 2,921,694 A * | 1/1960 | Decker et al. | 108/101 |
| 2,982,392 A | 5/1961 | Bossone | |
| 3,254,756 A | 6/1966 | Rankin | |
| 3,371,771 A | 3/1968 | Bugyi | |
| 4,437,568 A | 3/1984 | Hamblin | |
| 4,944,292 A | 7/1990 | Gaeke | |
| 5,244,220 A | 9/1993 | Cortez | |
| 5,380,033 A * | 1/1995 | Harling | 280/654 |
| 5,515,974 A | 5/1996 | Higson | |
| 6,124,796 A | 9/2000 | Hincher | |
| 6,220,610 B1 * | 4/2001 | Cox | 280/47.19 |
| 6,454,281 B1 * | 9/2002 | Pearson | 280/47.26 |
| 6,830,253 B1 * | 12/2004 | Porras et al. | 280/47.26 |
| 7,188,846 B2 | 3/2007 | Deavila | |
| 7,334,680 B2 | 2/2008 | Cunningham et al. | |
| 7,458,600 B1 | 12/2008 | Berke et al. | |
| 7,857,328 B1 * | 12/2010 | Boss | 280/47.25 |
| 7,946,598 B1 | 5/2011 | Malone, Jr. | |
| 2003/0000864 A1 | 1/2003 | Carraro | |
| 2009/0243243 A1 | 10/2009 | Watson | |

* cited by examiner

*Primary Examiner* — John Walters
(74) *Attorney, Agent, or Firm* — Bernard L. Kleinke; Duckor Spradling Metzger & Wynne

(57) ABSTRACT

A compact portable safety compliance station includes a frame having a base which is supported at one end above the ground with a wheel assembly and the other end by a pair of foot portions to support a waste receptacle in a holder mounted on the frame. A beverage dispenser holder is mounted on an upright portion of the frame for holding the beverage dispenser in a forward tilting position when the station is stationary on the ground with the base being disposed in a generally horizontal disposition. In its stationary upright position, the center of gravity of the dispenser is positioned above the base between the wheel assembly and the foot portions to stabilize the station.

9 Claims, 2 Drawing Sheets

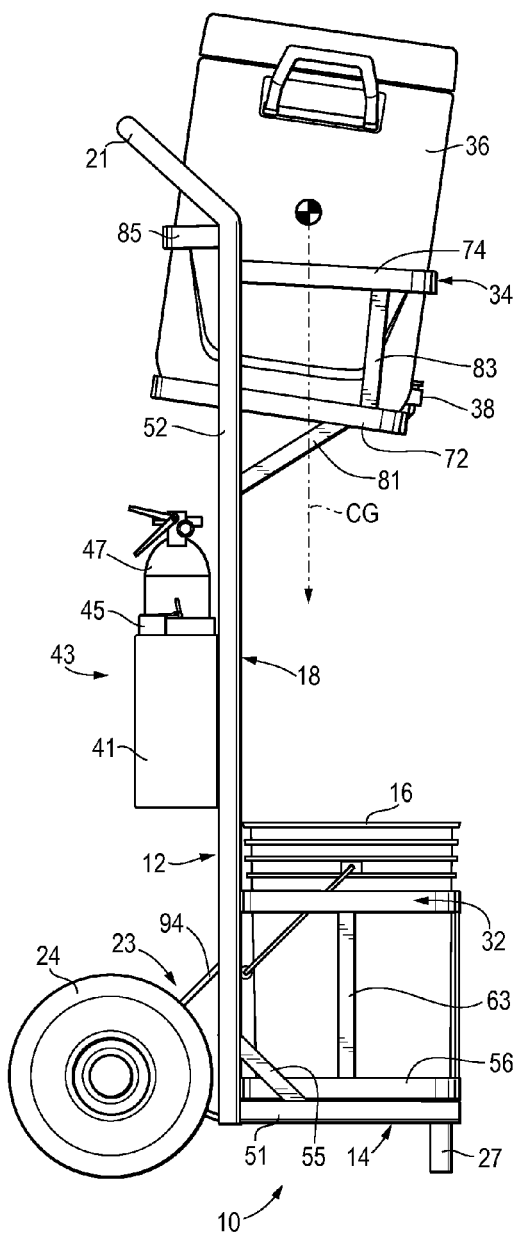
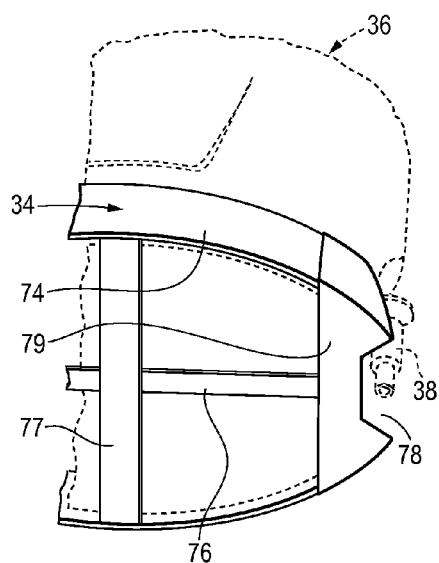
Fig. 2
Fig. 3

COMPACT PORTABLE SAFETY COMPLIANCE STATION AND METHOD OF MAKING SAME

RELATED APPLICATION

This application claims priority to U.S. provisional patent application, entitled MOBILE HYDRATION AND SAFETY STATION, application No. 61/513,934, filed Aug. 1, 2011, which is incorporated herein in its entirety by reference thereto.

FIELD OF THE INVENTION

The present invention in general relates to a compact portable safety compliance station and method of making it. The invention more particularly relates to such a new and improved rugitized compact portable safety compliance station, which may be used in demanding environments such, for example, as construction sites, farm sites, warehouses, machine shops, airports, athletic fields or other facilities.

BACKGROUND OF THE INVENTION

There is no admission that the background art disclosed in this section legally constitutes prior art.

There have been a number of different types and kinds of carts and other devices for carrying or otherwise transporting various different kinds of equipment. For example, reference may be made to the following U.S. Patent Applications and patents: 2003/0000864; 2009/0243243; U.S. Pat. Nos. 2,905,480; 2,982,392; 3,254,756; 3,371,771; 4,437,568; 4,944,292; 5,244,220; 5,515,974; 6,124,796; 6,830,253; 7,188,846; 7,334,680; 7,458,600; and 7,946,598.

The foregoing patents and patent applications disclose various different types of carts and dolly equipment for transporting various different types and kinds of equipment. In U.S. Pat. No. 6,830,253, there is disclosed an equipment dolly for transporting sporting equipment to desired locations. The equipment dolly includes a group of wire baskets or bins for confining sporting equipment. A liquid member is mounted on a shelf above the bins for holding liquid to be supplied to players using the sporting equipment.

Such an apparatus would not at all be suitable for use in much more demanding environments such as construction sites. For example, in use, when the patented dolly is stationary and resting on the ground it would tend to tilt forward under the weight of the equipment in the bins. In such a position, the weight of the liquid in the liquid member would cause the liquid member to slide forwardly and possibly fall off of its shelf. If the bins are unloaded or carrying light weight equipment as compared to the weight of the liquid member, the dolly would be top heavy and tend to tip over. In either situation, the patented dolly would not at all be useful in a job construction site or other more demanding environments. Also, the patented dolly, due to its size and shape, would be difficult to store and transport. The wire basket bins would also not be sufficiently durable and sturdy for use on a job site.

The overall width and construction of the patented dolly relative to the size of the water member would not at all be useful in narrow passageways such as construction site stair towers or construction site elevators which are very narrow confined spaces. Also, on construction sites for large buildings, it is important to be able to transport safety compliance equipment such as water coolers for hydration as well as fire extinguishers and first aid equipment, to various levels of the building under construction. The patented dolly does not at all lend itself to movement in narrow spaces and the ability to be readily transported to places such as upper floors or levels of a building under construction.

BRIEF DESCRIPTION OF THE DRAWINGS

In order to better understand the invention and to see how the same may be carried out in practice, non-limiting preferred embodiments of the invention will now be described with reference to the accompanying drawings, in which:

FIG. 2 is a side elevational view of the station of FIG. 1, illustrating it fully loaded; and FIG. 3 is an enlarged partially broken away view of FIG. 1 taken substantially on line 3-3 thereof.

DETAILED DESCRIPTION OF CERTAIN EMBODIMENTS OF THE INVENTION

Figure 1:
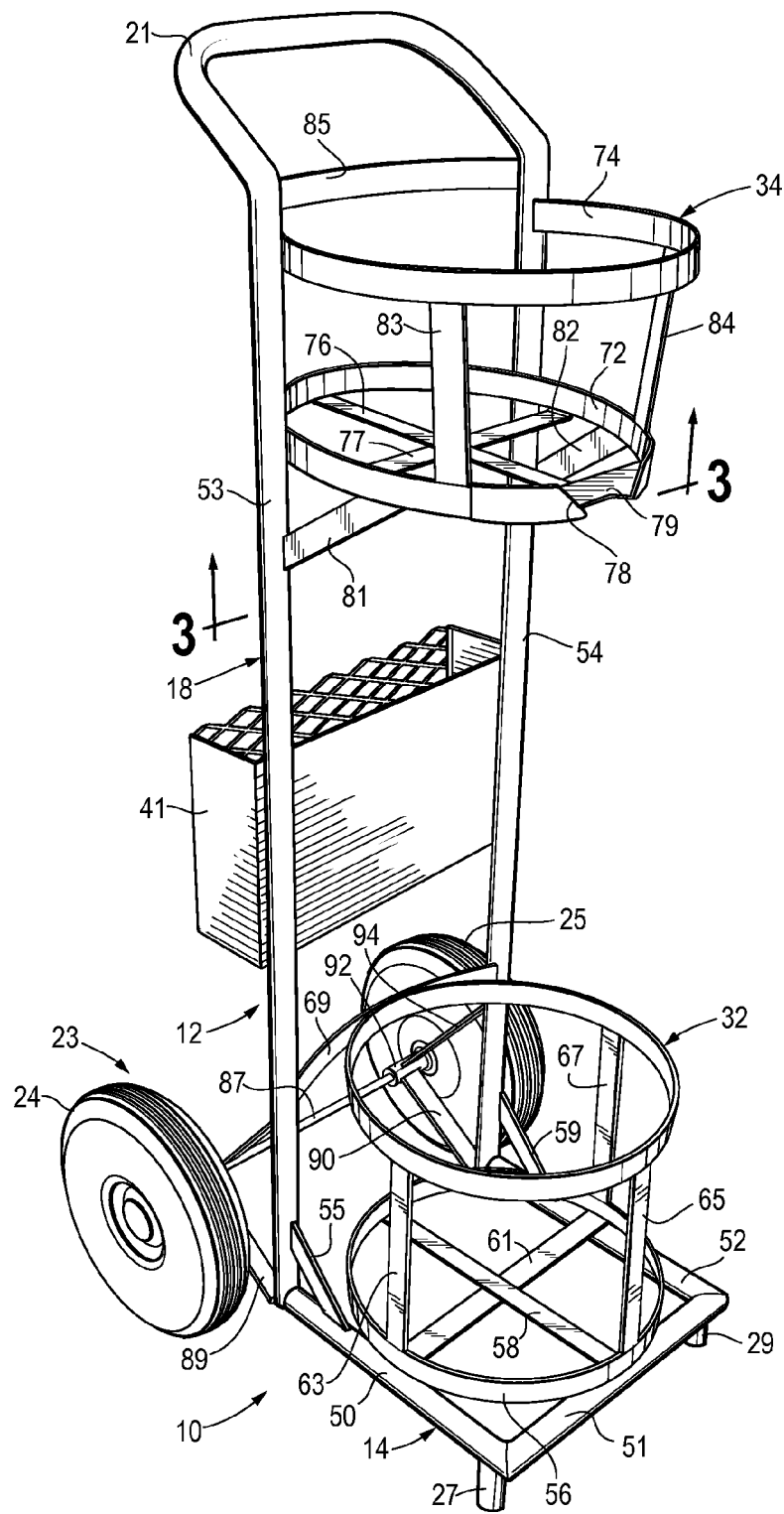
FIG. 1 is a pictorial view of a compact portable safety compliance station, which is constructed in accordance with an embodiment.

Certain embodiments of the present invention will now be described more fully hereinafter with reference to the accompanying drawings, in which some, but not all, embodiments of the invention are shown. Indeed, these embodiments of the invention may be in many different forms and thus the invention should not be construed as limited to the embodiments set forth herein; rather, these embodiments are provided as illustrative examples only so that this disclosure will satisfy applicable legal requirements. Like numbers refer to like elements throughout.

It will be readily understood that the components of the embodiments as generally described and illustrated in the drawings herein, could be arranged and designed in a wide variety of different configurations. Thus, the following more detailed description of the certain ones of the embodiments of the system, components and method of the present invention, as represented in the drawings, is not intended to limit the scope of the invention, as claimed, but is merely representative of the embodiment of the invention.

A compact portable safety compliance station includes a frame having a base which is supported at one end above the ground with a wheel assembly and the other end by a pair of foot portions to support a waste receptacle in a holder mounted on the frame. A beverage dispenser holder is mounted on an upright portion of the frame for holding the beverage dispenser in a forward tilting position when the station is stationary on the ground with the base being disposed in a generally horizontal disposition. In its stationary upright position, the center of gravity of the dispenser is positioned above the base between the wheel assembly and the foot portions to stabilize the station.

According to another embodiment, there is provided a method of making a compact portable safety compliance station by providing an open frame having a generally rectangular base adapted to be rollably supported above the ground and an upright portion terminating at its upper end in a handle. The method further includes journaling for rotation a pair of wheels near the rear corners of the base, and attaching a pair of feet near the front corners of the base to stabilize it in a generally horizontal position. The method also includes mounting on the frame a waste receptacle holder for securing removably a waste receptacle on the base. Also, the method includes fixing to the rear side of the upright portion of the frame a compartment for carrying safety equipment, and mounting on the upright portion of the frame near the handle portion a beverage dispenser holder. In mounting the beverage dispenser holder to the frame, a bottom portion of the holder is inclined downwardly away from the frame upper portion to enable liquid in the dispenser disposed within the holder to flow under the force of gravity toward a spigot of a beverage dispenser disposed in the dispenser holder. Thus, the inclining of the holder bottom portion positions the beverage dispenser center of gravity directly above the base between the wheels at the rear of the base and the spaced apart foot portions at the front portion of the base. In so doing, the station is stabilized at the base and the alignment of the center of gravity tends to prevent typing of the station.

Referring now to the drawing, and more particularly to FIGS. 1 through 3 thereof, there is shown a compact portable safety compliance station 10, which is constructed in accordance with an embodiment and which is illustrated unloaded. The station 10 includes an open frame 12, which includes a generally rectangular shaped base 14 for supporting a waste receptacle 16 as shown in FIG. 2. The waste receptacle may be in the form of a bucket or other open-topped container. A frame upright portion 18 is fixed at its bottom end to the rear end portion of the base 14 and terminates at its upper end in a U-shaped handle portion 21 which may be grasped by the hand of the user to transport the station 10 to other locations, or may be used as an attachment point for other equipment, such as a fork lift truck, to raise the station 10 upwardly to other higher locations such as an upper floor of a building under construction.

The base 14 includes a wheel assembly generally indicated at 23 to facilitate the base, and thus the station 10, to be rollably supported above the ground. In so doing, the user may grasp the handle portion 21 to tilt the frame upright portion 18 rearwardly about the wheel assembly 23 to roll the station 10 along the ground to another location. The wheel assembly 23 includes a pair of wheels 24 and 25 journaled for rotation to the rear of the base 16 and a pair of spaced apart foot portions 27 and 29 are disposed at opposite corners of the front portion of the base 14. In this manner, when the station 10 is disposed as shown in FIG. 2 in a stationary manner, the base 14 is generally horizontal, and the front two foot portions 27 and 29 are so positioned to engage the ground to facilitate the base being in a generally horizontal disposition. The foot portions 27 and 29 are particularly useful when the ground is not smooth and level to properly engage the ground and stabilize the station 10.

A waste receptacle holder 32 is fixed to the frame 12 for confining the receptacle 16 when it is carried by the movable station 10. Similarly, a beverage dispenser holder 34 is secured to the frame upright portion 18 near the handle portion 21 for confining and carrying a beverage dispenser 36 having a spigot or outlet 38 for liquid contained therein. The beverage dispenser 36 may contain a variety of different liquids such as water and other beverages as desired. As best seen in FIG. 2, the beverage dispenser 36 is inclined forwardly to direct the liquid contained therein toward the spigot 38 to facilitate emptying the dispenser 36, when the station 10 is disposed in an upright stationary position as shown in FIG. 2. The dispenser 36 may also have a drinking cup holder (not shown) attached to it so that when the user pours a drink from the dispenser 36, and consumes the beverage, the cup may be disposed of in the receptacle 16 in a convenient manner so that when the station 10 is removed from the job site or other location, the disposable drinking cups can be removed with the station 10.

Even though the dispenser 36 is inclined in a forwardly tilted manner, it is held in place removably by the holder 32. Also, the heavy dispenser 36 has its center of gravity disposed directly above the base 14 to prevent or greatly reduce the possibility of tilting the station 10 in an unwanted manner, and thus the station 10 is stabilized.

A compartment 41 is fixed to the rear side of the frame upper portion 18 and is in the form of an open top box for storing safety equipment generally indicated at 43. The safety equipment 43 may include a first aid kit 45 and a fire extinguisher 47. Thus, when the station 10 is loaded as indicated in FIG. 2, water may be provided in the beverage dispenser 36, and the safety equipment 43 enable the station 10 to comply with governmental regulations such as those imposed by the Occupational Safety and Health Administration (OSHA) requirements. The water contained in the dispenser 36 is used for hydration of the workers at a job site as required by OSHA requirements.

Considering now the base 14 in greater detail with reference to FIG. 1, the base 49 generally comprises a U-shaped rod arrangement. The rod arrangement 49 is formed by three rods or bars 50, 51 and 52 in a U-shaped configuration and is fixed at its rear end to the wheel assembly 23.

Considering now the frame upright portion 18, it generally comprises a pair of parallel spaced-apart rods or bars 53 and 54. A pair of struts 55 and 59 are connected between the rods 53 and 54 and the respective rods 50 and 52 of the base 14.

The waste receptacle holder 56 includes a lower circular band 56 and an upper circular band 57. A pair of strips or bars 58 and 61 are arranged in a X-shaped or cruciform shape fixed to the lower circular band 56 for supporting the waste receptacle 16 from below. A series of upright strips or bars 63, 65 and 67 are fixed between the lower and upper bands 56 and 57. A gently curved strip or bar 69 extends between the lower portions of the upright rods 53 and 54 of the frame upright portion 18 for attaching to the upper circular band 57 to help secure the holder 32 in place.

The beverage dispenser holder 34 is mounted directly above the waste receptacle holder 32 and is spaced therefrom. The holder 34 includes a lower circular band 72 and an upper generally C-shaped band 74 to receive the dispenser 36. A pair of strips or bars 76 and 77 are arranged in a general X-shape or cruciform shaped configuration and fixed to the bottom circular band 72 to support the dispenser 36 from below. A spigot receiving recess 78 is provided by a gap in the circular band 72 to receive the spigot 38 of the dispenser 36. A plate 79 also includes a cut out portion to help receive the spigot 38. A pair of struts 81 and 82 are fixed between the underside of the circular band 72 and the respective rods 53 and 54 of the frame upright portion 18 to help support the holder and the dispenser. A pair of upright strips or bars 83 and 84 are connected between the lower circular band 72 and the upper C-shaped band 74. A gently curved strip 85 is similar to the strip 69 and is connected between the rods 53 and 54 near the handle 21 to help support the dispenser 36 and best seen in FIG. 2.

The wheel assembly 23 includes an axle 87 for the wheels 24 and 25. A pair of downwardly extending struts 89 and 90 connect the base 14 to the wheel assembly 23 so that the base 14 is disposed at a lower location as compared to the axle 87 to help support the base 14 in a generally horizontal disposition as shown in FIG. 2. Each one of these struts 89 and 90 include at its upper end a bearing such as an axle bearing 92 for the strut 90 to journal the axle 87 for rotation there about. Additionally, a pair of support struts such as a support strut 94 enter connect the bearing such as the axle bearing 92 with the respective frame rods 53 and 54.

Broadly, an embodiment generally provides a mobile device or station that may allow storage and transportation of a beverage such as water, safety equipment, and/or other equipment. For certain applications, the device or station may operate over an extended area based on various appropriate factors. For example, the device or station may be positioned such that the device or station may be located within a range of about one hundred yards of potential users at al times. The device or station may be able to store and transport safety equipment including items such as a five-gallon container for holding liquids, multiple cups, a waste receptacle (to prevent refuse such as cups from being littered over the extended area), a first aid kit (e.g., a 30-person first aid kit), a fire extinguisher (as may be required every 3000 square feet of a construction site) and other. The device or station may be configured and operated such that all Occupational Safety and Health Administration (OSHA) requirements are satisfied.

The device or station may allow many necessary items to be conveniently stored and transported together (e.g., all California OSHA required items may be carried using a single device). The device or station may be configured such that the station may be visible (and recognizable) over a large area (e.g., by painting the station with a bright color or colors, attaching a flag or sign to the station, etc.). The device or station may also be configured such that that all items are highly visible while being protected from damage. In addition, the device or station may be configured to allow use (e.g., movement, maintenance, etc.) by a single operator using minimal effort. The device or station may also be configured to be sturdy and durable while still allowing use by a single operator. The device may be used in a variety of settings, including, but not limited to: construction sites, farm sites, other field work, warehouses, machine shops, airports (e.g., on the tarmac), athletic fields or facilities, parks or playgrounds, and others.

As shown in FIG. 1, some embodiments of the device may include one or more of a heavy duty carrier element such as the frame 12 (i.e., a structural element capable of supporting the equipment stored and transported by the station movement elements (e.g., the wheel assembly 23 including off-road tires attaché to the pair of wheels 24 and 25 connected by the axle, the beverage dispenser dispenses 36 such as a five gallon cooler, or other appropriate size fresh water container and storage compartment, sterile paper cups and dispenser (not shown), a first aid kit and storage compartment 41 (or other appropriate element allowing storage of a first aid kit), a fire extinguisher 47 carried in the compartment 14 (or other appropriate element allowing storage of a fire extinguisher such that the fire extinguisher may be readily accessed), and a waste receptacle 16 and the waste receptacle holder 32 (or other appropriate element allowing storage of a waste receptacle such as a bucket such that the receptacle may be freely accessed). In some cases, the station 10 may function as a durable mobile dolly capable of carrying the safety equipment and being used by a single person. In addition, the station 10 may include pick-up points such as the handle portion 21 that may allow the device to be hoisted (e.g., by a crane (not shown), fork lift (not shown), etc.) The station may include multiple pick points for use in different situations (e.g., one pick point may be used for an unloaded device, while another pick point is used for a loaded device, etc.). The pick points may allow the device (or multiple devices) to be used throughout multiple levels of a building or other site, as appropriate.

The various elements of the device or station may be fashioned using various ridged materials such as metal components, by shaping, welding, painting, etc) or other appropriate processes (e.g., by forming plastic components using an injection molding machine). The device or station may also include various other elements, as necessary. For instance, some embodiments may include a handle, grip or other appropriate element to allow the device to be moved even more easily. As another example, some embodiments may include one or more straps (and/or connection points) that allow various equipment to be held securely on the device. Some embodiments may also include various other safety equipment (e.g., eye wash safety equipment).

The device or station may also be configured in various different ways depending on various appropriate factors. For instance, some embodiments may use larger wheels and tires to allow use over a variety of terrain. As another example, different embodiments may allow use of different sized waste receptacles or water containers, or a single embodiment may allow use of multiple sizes or waste receptacles and/or water containers. As yet another example, some embodiments may be configured to provide a greater number of storage elements, and mounts or holders, large storage elements and mounts or compartments, and others.

The device or station may be operated by attaching the various equipment with the device (e.g., by filling and attaching the water container, placing a first aid kit, fire extinguisher, and/or waste receptacle in the appropriate compartments and/or mounts or holders, etc.). During use, the device or holder may be moved to different locations as appropriate, while the attached such as safety equipment, may be accessed.

Although the invention has been described with reference to the above examples, it will be understood that many modifications and variations are contemplated within the true spirit and scope of the embodiments as disclosed herein. Many modifications and other embodiments set forth herein will cove to mind to one skilled in the art to which the invention pertains having the benefit of the teachings presented in the foregoing descriptions and the associated drawings. Therefore, it is to be understood that the invention shall not be limited to the specific embodiments disclosed and that modifications and other embodiments are intended and contemplated to be included within the scope of the appended claims. Although specific terms are employed herein, they are used in a generic and descriptive sense only and not for purposes of limitation.

What is claimed is:

1. A compact portable safety compliance station storing a waste receptacle, beverage dispenser and safety equipment comprising:
   an open frame having a base for supporting the waste receptacle, the base being adapted to be supported rollably above the ground and having an upright portion fixed to the rear end of the base, the top end of the upright portion terminating in a handle portion;
   the base being generally rectangular in shape and includes a wheel assembly having a pair of wheels journaled for rotation near the rear corners of the base and a pair of foot portions at the front corners of the base;
   a waste receptacle holder mounted on the frame for securing removably the waste receptacle on the base;
   a beverage dispenser holder mounted on the upright portion of the frame near the handle portion;
   the beverage dispenser holder having a bottom portion inclined downwardly away from the upright portion of the frame to enable a beverage dispenser disposed in the holder to cause liquid beverage in the dispenser to flow toward a dispenser spigot and to cause the center of gravity of the dispenser to be positioned above the base between the wheels and the foot portions to stabilize the station; and a compartment fixed to the rear side of the upright portion of the frame for carrying the safety equipment.

2. A compact portable safety compliance station according to claim 1, wherein the base includes a U-shaped rod arrangement.

3. A compact portable safety compliance station according to claim 2, wherein the upper frame portion includes a pair of parallel spaced apart rods connected at their bottom ends to the base.

4. A compact portable safety compliance station according to apparatus according to claim 3, wherein the waste receptacle holder include a pair of upper and lower circular bands formed together by upstanding strips.

5. A compact portable safety compliance station according to apparatus according to claim 4, wherein the waste receptacle bolder further includes a pair of strips arranged in an X-shaped configuration fixed to the lower circular band.

6. A compact portable safety compliance station according to claim 5, wherein the beverage dispenser holder includes a lower circular band and an upper c-shaped band.

7. A compact portable safety compliance station according to claim 6, wherein the wheel assembly includes a pair of struts downwardly extending from the wheels, and an axle extending between the wheels, each one of the struts including a bearing for receiving the axle.

8. A method of making a compact portable safety compliance station, comprising:
   providing an open frame having a generally rectangular base adapted to be rollably supported above the ground, and an upright portion, the upper end of the upright portion terminating in a handle;
   journalling for rotation a pair of wheels near the rear corners of the base;
   attaching a pair of foot portions near the front corners of the base to stabilize it in a generally horizontal position;
   mounting on the frame a waste receptacle holder for securing removably a waste receptacle on the base;
   fixing to the rear side of the upright portion of the frame a compartment for carrying safety equipment;
   mounting on the upright portion of the frame near the handle portion a beverage dispenser holder;
   inclining downwardly away from the frame upper portion a bottom portion of the dispenser holder to enable liquid in the dispenser disposed within the holder to flow under the force of gravity toward a spigot of a beverage dispenser disposed in the dispenser holder; and
   wherein the inclining of the holder bottom portion positions the beverage dispenser center of gravity directly above the base between the base wheels and the base foot portions to stabilize the dispenser on the station when it is stationary with the base being generally horizontal.

9. A compact portable safety compliance station, comprising:
   a waste receptacle;
   an open frame having a base for supporting the waste receptacle, the base being adapted to be supported rollably above the ground and having an upright portion fixed to the rear end of the base, the top end of the upright portion terminating in a handle portion;
   the base being generally rectangular in shape and includes a wheel assembly having a pair of wheels journaled for rotation near the rear corners of the base and a pair of foot portions at the front corners of the base;
   a waste receptacle holder mounted on the frame for securing removably the waste receptacle on the base;
   a beverage dispenser;
   a beverage dispenser holder mounted on the upright portion of the frame near the handle portion;
   the beverage dispenser holder having a bottom portion inclined downwardly away from the upright portion of the frame to enable the beverage dispenser disposed in the holder to cause liquid beverage in the dispenser to flow toward a dispenser spigot and to cause the center of gravity of the dispenser to be positioned above the base between the wheels and the foot portions to stabilize the station;
   safety equipment; and
   a compartment fixed to the rear side of the upright portion of the frame for carrying the safety equipment.

* * * * *